United States Patent [19]
Harris et al.

[11] Patent Number: 5,715,494
[45] Date of Patent: Feb. 3, 1998

[54] FILM CARTRIDGE WITH FILM-EXPOSED VISUAL INDICATOR

[75] Inventors: Clark Eugene Harris, Fairport; Mark David Fraser, Hamlin, both of N.Y.

[73] Assignee: Eastman Kodak Company, Rochester, N.Y.

[21] Appl. No.: 627,163

[22] Filed: Apr. 3, 1996

[51] Int. Cl.$^6$ .................................. G03B 17/26
[52] U.S. Cl. ........................................ 396/515
[58] Field of Search ............... 354/275; 396/512, 396/514, 515

[56] References Cited

U.S. PATENT DOCUMENTS

| | | | |
|---|---|---|---|
| 4,978,985 | 12/1990 | Smart et al. | 354/275 |
| 5,030,978 | 7/1991 | Stoneham et al. | 354/21 |
| 5,106,030 | 4/1992 | Pagano et al. | 242/71.1 |
| 5,115,268 | 5/1992 | Kitagawa et al. | 354/275 |
| 5,278,600 | 1/1994 | Takahashi et al. | 354/275 |
| 5,384,613 | 1/1995 | Cloutier et al. | 354/275 |
| 5,552,849 | 9/1996 | DiRisio et al. | 354/275 |

FOREIGN PATENT DOCUMENTS

| | | | |
|---|---|---|---|
| 431 529 A2 | 12/1991 | European Pat. Off. | G03B 17/30 |

*Primary Examiner*—Safet Metjahic
*Assistant Examiner*—John Chizmar
*Attorney, Agent, or Firm*—Roger A. Fields

[57] ABSTRACT

A film cartridge comprising a rotatable film spool, an indicator window, an annular indicator wheel rotatable behind the indicator window to move a film-exposed indication on the indicator wheel to the indicator window, and an annular drive wheel rotatably coupled with the film spool for rotating the indicator wheel to move the film-exposed indication to the indicator window, is characterized in that the indicator wheel is resilient and a flex-inducing protuberance is located to distort successive portions of the indicator wheel towards the indicator window as the indicator wheel is rotated, to position the film-exposed indication in the indicator window.

8 Claims, 4 Drawing Sheets

FILM CARTRIDGE WITH FILM-EXPOSED VISUAL INDICATOR

CROSS-REFERENCE TO RELATED APPLICATIONS

Reference is made to commonly assigned copending applications Ser. No. 08/629,699, entitled FILM CARTRIDGE WITH VISUAL FILM MOTION INDICATOR FOR VERIFYING FILM LOADING IN CAMERA and filed Apr. 9, 1996 in the names of Joseph A. Manico, Richard S. Keirsblick, John A. Agostinelli and Edgar G. Earnhart, Ser. No. 08/586,520 entitled FILM CARTRIDGE WITH VISUAL INDICATOR FOR VERIFYING FILM LOADING IN CAMERA and filed Jan. 16, 1996 in the names of Madhav Mehra and Joseph A. Manico, Ser. No. 08/584,583, entitled FILM CARTRIDGE WITH VISUAL INDICATOR FOR VERIFYING FILM LOADING IN CAMERA and filed Jan. 11, 1996 in the names of Madhav Mehra and Joseph A. Manico, Ser. No. 08/584,480, entitled FILM CARTRIDGE WITH VISUAL INDICATOR FOR VERIFYING FILM LOADING IN CAMERA and filed Jan. 11, 1996 in the names of Joseph A. Manico and Dwight J. Petruchik, and Ser. No. 08/449,032, entitled FILM SPOOL WITH BUILT-IN AUDIBLE INDICATOR FOR VERIFYING FILM LOADING IN CAMERA and filed May 24, 1995 in the name of Joseph A. Manico.

FIELD OF THE INVENTION

The invention relates generally to the field of photography, and in particular to a film cartridge with a film exposed visual indicator

BACKGROUND OF THE INVENTION

It is known for a film cartridge to have a film exposure status indicator for providing a visual indication that a filmstrip inside the cartridge housing has been exposed.

For example, prior art U.S. Pat. No. 5,278,600, issued Jan. 11, 1994, discloses a film cartridge comprising a film spool rotatable inside the cartridge housing, an indicator window in an end cap of the cartridge housing, an annular indicator wheel rotatable inside the cartridge housing behind the indicator window to move a film-exposed indication on the indicator wheel to the indication window, and an annular drive wheel rotatably linked with the film spool for rotating the indicator wheel to move the film-exposed indication to the indication window. A pin and receiver clutch device transmits movement of the drive wheel to the indicator wheel when the film spool is rotated in a film unwinding direction, and leaves the indicator wheel and the drive wheel disconnected when the film spool is rotated in a film winding direction.

SUMMARY OF THE INVENTION

A film cartridge comprising a rotatable film spool, an indicator window, an annular indicator wheel rotatable behind the indicator window to move a film-exposed indication on the indicator wheel to the indicator window, and an annular drive wheel rotatably coupled with the film spool for rotating the indicator wheel to move the film-exposed indication to the indicator window, is characterized in that:

the indicator wheel is resilient; and a flex-inducing protuberance is located to distort successive portions of the indicator wheel towards the indicator window as the indicator wheel is rotated, to position the film-exposed indication in the indicator window.

Preferably, the film-exposed indicator is on one side of the indicator wheel and a driven member is on an opposite side of the indicator wheel proximate the film-exposed indicator. The drive wheel includes a drive member engageable with the driven member for rotating the indicator wheel. And the flex-inducing protuberance separates the driven member from the drive member to hold the driven member out of the way of the drive member when the film-exposed indication is positioned in the indicator window.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Figure 1:
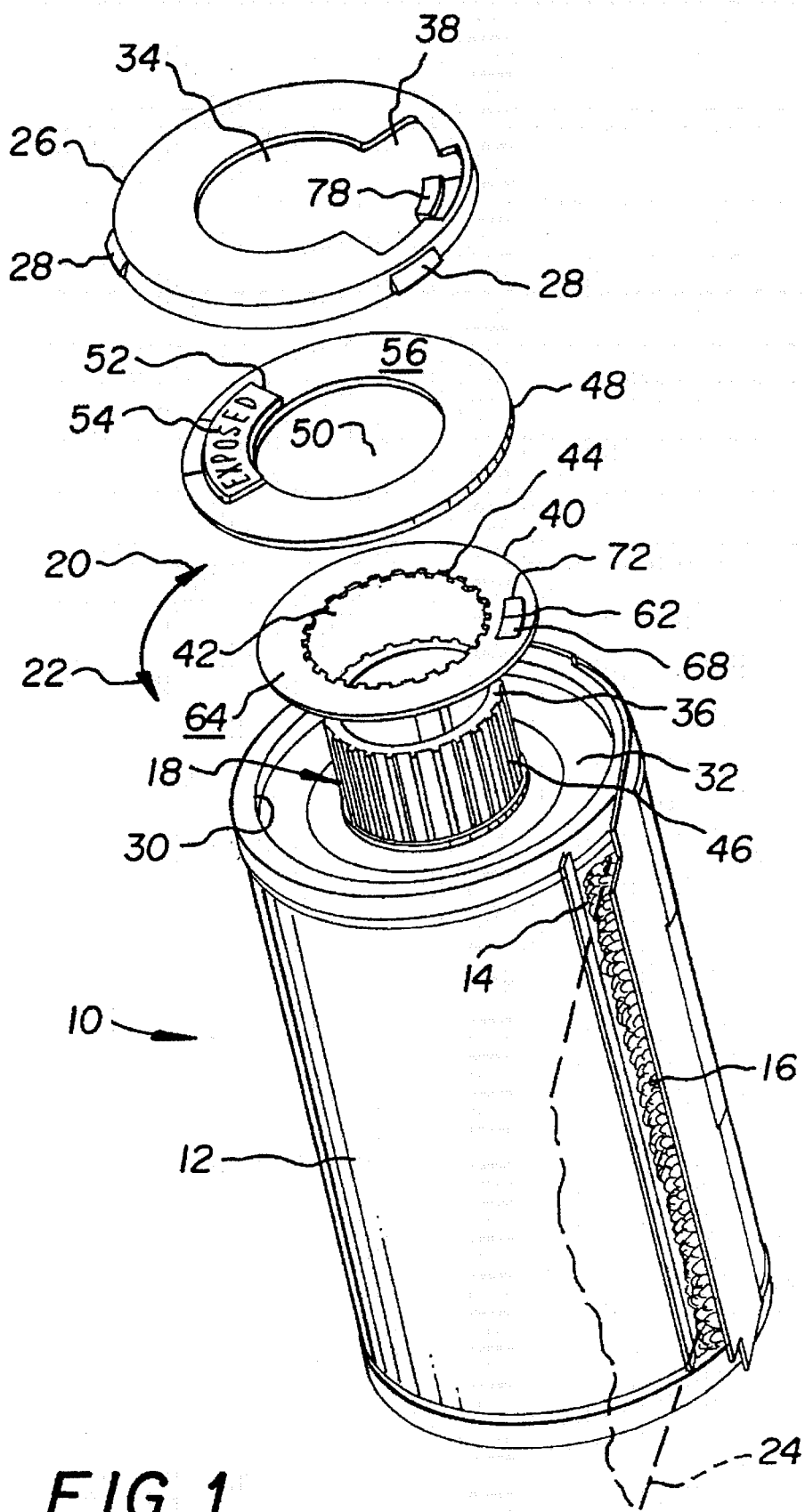
FIG. 1 is an exploded top perspective view of a film cartridge with a film-exposed visual indicator according to a preferred embodiment of the invention.
Figure 2:
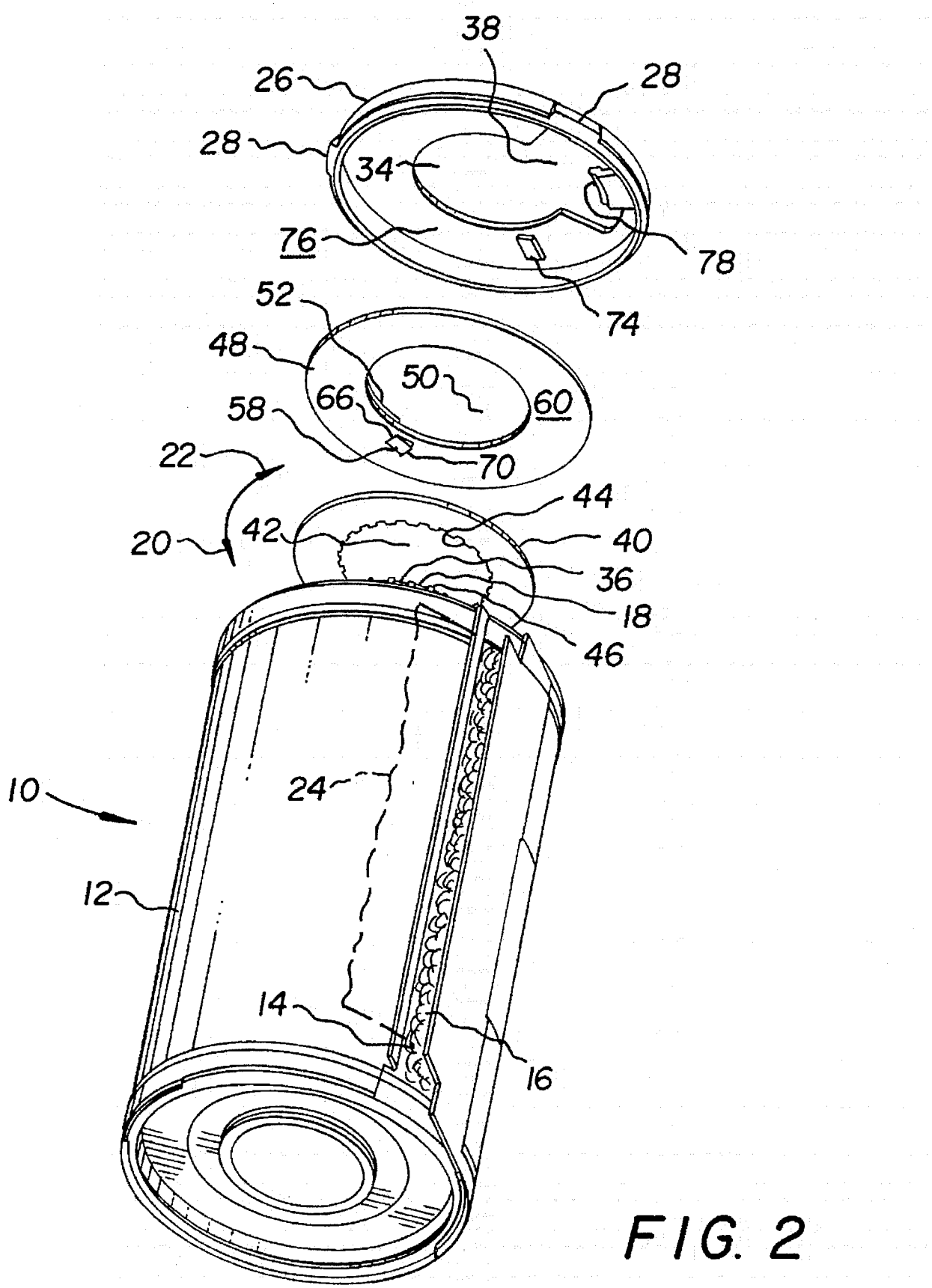
FIG. 2 is an exploded bottom perspective view of the film cartridge.
Figure 3:
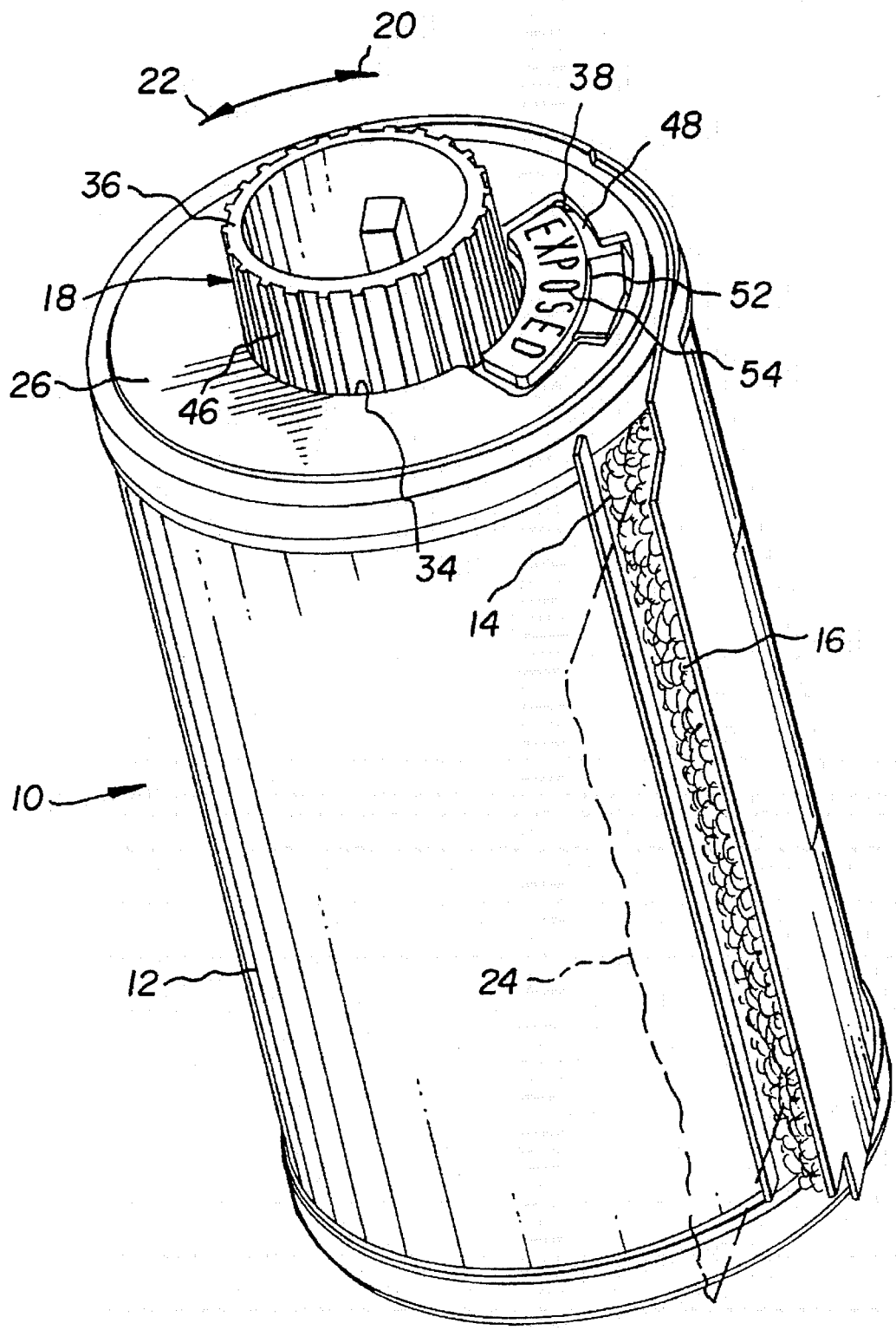
FIG. 3 is an assembled top perspective view of the film cartridge.
Figure 4:
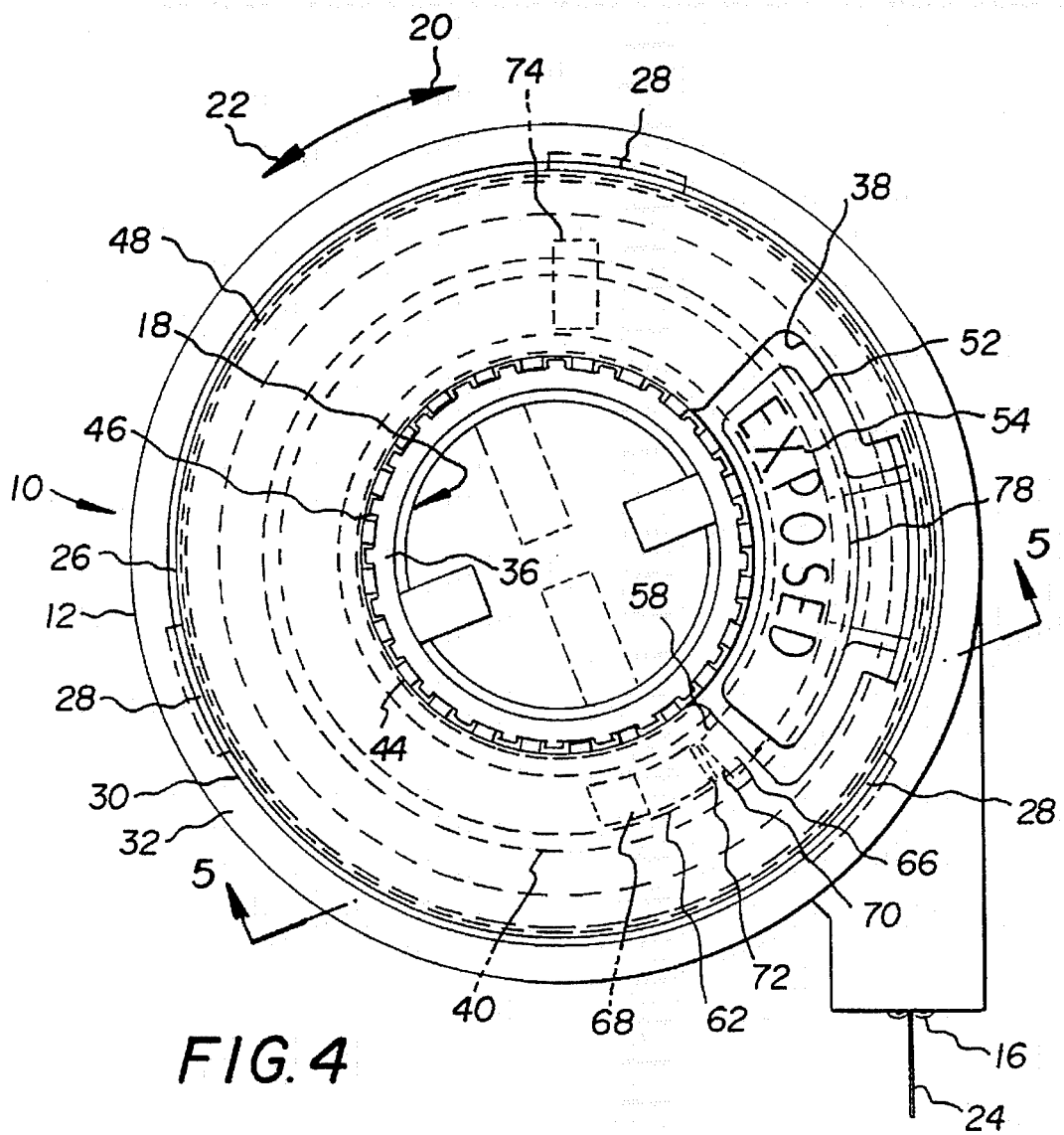
FIG. 4 is a top plan view of the film cartridge.

Referring now to the drawings, FIGS. 1–3 show a film cartridge 10. The film cartridge 10 as is typical includes a cartridge housing 12 having a film egress/ingress slit 14 which is lined with a light-trapping plush 16. A film spool 18 is rotatably supported inside the cartridge housing 12 for rotation in film unwinding and film winding directions 20 and 22. A film roll, not shown, having a film leader 24 originally protruding from the slit 14 is coiled about the film spool 18.

A cover cap 26 has three identical, evenly spaced, snap latches 28, 28 and 28 that are engaged with an annular crimped edge 30 of an end cap 32 of the cartridge housing 12 to secure the cover cap to the end cap. See FIGS. 1–5. The cover cap 26 has a center hole 34 through which a protruding end portion 36 of the film spool 18 extends, and it has an indicator window or opening 38 which is open to the center hole. The diameter of the center hole 34 is slightly greater than the diameter of the protruding end portion 36 of the film spool 18 to permit the protruding end portion to freely rotate within the center hole.

An annular drive wheel 40 is located between the cover cap 26 and the end cap 32, within the three snap latches 28 of the cover cap and the annular crimped edge 30 of the end cap. The drive wheel 40 has a center hole 42 with a multi-toothed rim 44 locked in engagement with a castellated periphery 46 of the protruding end portion 36 of the film spool 18, to rotatably couple the drive wheel and the film spool. Thus, rotation of the film spool 18 in the film winding and unwinding directions 20 and 22 will similarly rotate the drive wheel 40.

A resilient annular indicator wheel 48 is located between the drive wheel 40 and the cover cap 26, within the three snap latches 28 of the cover cap and the annular crimped edge 30 of the end cap. The indicator wheel 48 has a center hole 50 whose diameter is greater than the diameter of the protruding end portion 36 of the film spool 18. This permits the castellated periphery 46 of the protruding end portion 36 to extend through the center hole 50 without touching the indicator wheel 48.

An indicator block 52 having a film-exposed indication 54 is on a top side 56 of the indicator wheel 48. See FIGS. 1–5. A driven member 58 is on a bottom side 60 of the indicator wheel 48 proximate or beneath the indicator block 52. A drive member 62 is on a top side 64 of the drive wheel 40. The driven member 58 and the drive member 62 have mutually inclined faces 66 and 68 which allow the drive member to be rotated without engaging the driven member when the drive wheel 40 is rotated with the film spool 18 in the film unwinding direction 20, and they have respective substantially vertical faces 70 and 72 which engage when the drive wheel is rotated with the film spool in the film winding direction 22. Thus, rotation of the drive wheel 40 in the film unwinding direction 20 will not forcibly rotate the indicator wheel 48 in the same direction. Nevertheless, a fixed stop 74 is located on the underside 76 of the cover cap 26 in the way of the indicator block 52, for preventing the indicator wheel 48 from rotating in the film unwinding direction 20 to move the indicator block to beneath the indicator window 38 in the cover cap when the drive wheel 40 is rotated in the film unwinding direction. See FIG. 2. Conversely, rotation of the drive wheel 40 in the film winding direction 22 will forcibly rotate the indicator wheel 48 in the same direction to move the indicator block 52 to beneath the indicator window 38 in the cover cap 26.

Figure 5:
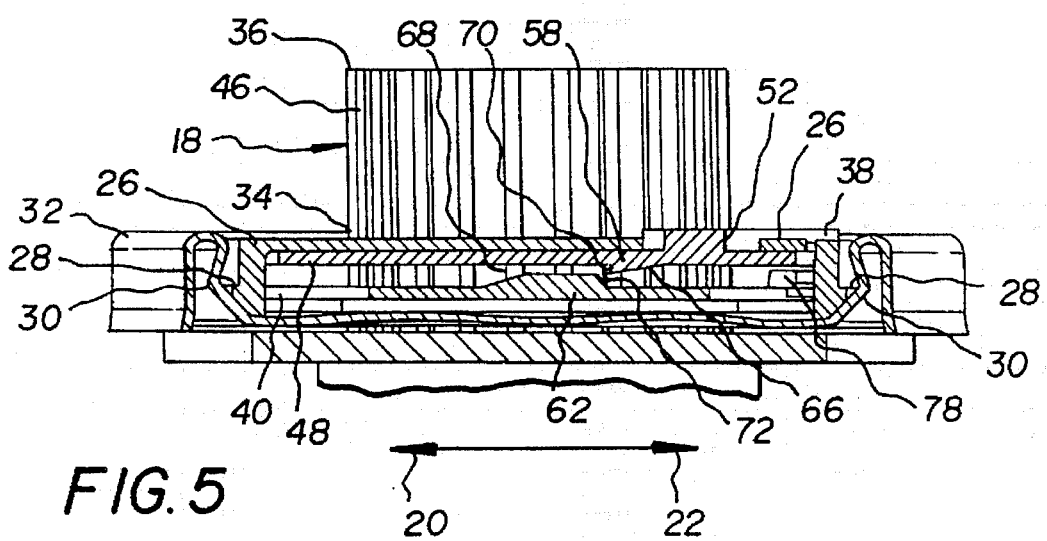
FIG. 5 is a cross-section view as seen in the direction of the arrowed line 5—5 in FIG. 4.

A flex-inducing protuberance 78 projects radially inward, beneath the indicator window 38, from an inner side wall of the cover cap 26. The flex-inducing protuberance 78 distorts successive portions of the indicator wheel 48 towards the indicator window 38 as the indicator wheel is forcibly rotated in the film winding direction 22, when the drive wheel 40 is rotated in the same direction. When the particular portion of the indicator wheel 48 that carries the indicator block 52 is distorted towards the indicator window 38, the indicator block is raised into the indicator window as shown in FIG. 5. Simultaneously, the driven member 58 is raised from the drive member 62 to separate the substantially vertical face 70 of the driven member from the substantially vertical face 72 of the drive member. When the indicator block 52 is in the indicator window 38, further rotation of the indicator wheel 48 is prevented and the driven member 58 is held out of the way of the drive member 62. Thus, the drive wheel 40 can continue to be rotated with the film spool 18 in the film winding direction 22 without having to similarly rotate the indicator window 38.

The invention has been described with reference to a preferred embodiment. However, it will be appreciated that variations and modifications can be effected by a person of ordinary skill in the art without departing from the scope of the invention.

PARTS LIST 10. film cartridge
12. cartridge housing
14. film egress/ingress slit
16. light-trapping plush
18. film spool
20. film unwinding direction
22. film winding direction
24. protruding film leader
26. cover cap
28. snap latches (3)
30. annular crimped edge
32. end cap
34. center hole
36. protruding spool end portion
38. indicator window
40. drive wheel
42. center hole
44. multi-toothed rim
46. castellated periphery
48. indicator wheel
50. center hole
52. indicator block
54. film-exposed indication
56. top side
58. driven member
60. bottom side
62. drive member
64. top side
66. inclined face
68. inclined face
70. substantially vertical face
72. substantially vertical face
74. fixed stop
76. underside
78. flex-inducing protuberance

We claim:

1. A film cartridge comprising a rotatable film spool, an indicator window, an annular indicator wheel rotatable behind said indicator window to move a film-exposed indication on said indicator wheel to said indicator window, and an annular drive wheel rotatably coupled with said film spool for rotating said indicator wheel to move said film-exposed indication to said indicator window, is characterized in that:

said indicator wheel is resilient; and a flex-inducing protuberance is located beneath said indicator wheel to distort successive portions of said indicator wheel towards said indicator window as the indicator wheel is rotated, to position said film-exposed indication in the indicator window.

2. A film cartridge as recited in claim 1, wherein said indicator wheel has two substantially flat sides, said film-exposed indicator is on one of said sides of said indicator wheel and a driven member is on another of said sides of the indicator wheel proximate said film-exposed indicator, said drive wheel includes a drive member engageable with said driven member for rotating said indicator wheel, and said flex-inducing protuberance is located to separate said driven member from said drive member to hold the driven member out of the way of the drive member when said film-exposed indication is positioned in said indicator window.

3. A film cartridge as recited in claim 1, wherein said flex-inducing protuberance is fixed to be continuously non-rotatable, to allow said indicator wheel to be rotated relative to the flex-inducing protuberance, and is a single piece separate from the indicator wheel.

4. A film cartridge as recited in claim 2, wherein said film spool is rotatable in film unwinding and film winding directions to similarly rotate said drive wheel, and said drive member and said driven member are complementarily shaped to allow said drive member to be rotated continuously without engaging said driven member when said drive wheel is rotated in the film unwinding direction and to make the drive member engage the driven member only when the drive wheel is rotated in the film winding direction.

5. A film cartridge as recited in claim 4, wherein a fixed stop is spaced from said indicator window and located to engage said indicator wheel to prevent rotation of the indicator wheel to position said film-exposed indicator in said indicator window when said film spool is rotated in the film unwinding direction.

6. A film cartridge comprising a rotatable film spool, an indicator window, an annular indicator wheel rotatable behind said indicator window to move a film-exposed indication on said indicator wheel to said indicator window, and an annular drive wheel rotatably coupled with said film spool for rotating said indicator wheel to move said film-exposed indication to said indicator window, is characterized in that:

said indicator wheel has a top side and a bottom side;

said film-exposed indicator is on said top side of said indicator wheel and a driven member is on said bottom side of the indicator wheel proximate said film-exposed indicator; and said drive wheel is continuously engaged with said film spool to be rotated whenever the film spool is rotated and includes a drive member which is complementarily shaped relative to said driven member to allow said drive member to be rotated continuously without engaging the driven member whenever the drive wheel is rotated in a particular direction and to make the drive member engage the driven member for rotating said indicator wheel to move said film-exposed indication to said indication window only when the drive wheel is rotated in another direction.

7. A film cartridge as recited in claim 6, wherein said drive member and said driven member have respective mutually inclined integral faces which allow the drive member to be rotated without ever engaging the driven member when the drive wheel is rotated in said particular direction and have respective vertical faces which engage when the drive wheel is rotated in said other direction.

8. A film cartridge comprising a rotatable film spool, an indicator window, an annular indicator wheel rotatable behind said indicator window to move a film-exposed indication on said indicator wheel to said indicator window, and an annular drive wheel rotatably coupled with said film spool for rotating said indicator wheel to move said film-exposed indication to said indicator window, is characterized in that:

said indicator wheel has a top side and a bottom side;

said film-exposed indicator is only on said top side of said indicator wheel and a driven member is on said bottom side of the indicator wheel; and said drive wheel is continuously engaged with said film spool to be rotated whenever the film spool is rotated and includes a drive member located on the drive wheel for rotating said driven member to similarly rotate said indicator wheel to move said film-exposed indication to said indication window, which is complementarily shaped relative to said driven member to allow said drive member to be rotated without rotating the driven member whenever the drive wheel is rotated in a particular direction and to cause the drive member to rotate the driven member only when the drive wheel is rotated in another direction.

* * * * *